United States Patent [19]
Blatchford

[11] Patent Number: 5,662,865
[45] Date of Patent: Sep. 2, 1997

[54] FUMIGATION CHAMBER

[75] Inventor: Bevin Henry Shenton Blatchford, Pretoria, South Africa

[73] Assignee: Degesch GmbH, Laudenbach/Bergstrasse, Germany

[21] Appl. No.: 531,909

[22] Filed: Sep. 21, 1995

[30] Foreign Application Priority Data

Sep. 22, 1994 [ZA] South Africa ............... 94/7377

[51] Int. Cl.⁶ ............... A61L 9/00; A01M 7/00; A23N 4/00
[52] U.S. Cl. ............... 422/29; 422/32; 422/113; 422/114; 422/292; 422/305; 43/125; 99/473
[58] Field of Search ............... 422/29, 32, 113, 422/114, 292, 305; 99/467, 473; 43/125; 426/312, 320

[56] References Cited

U.S. PATENT DOCUMENTS

| | | | |
|---|---|---|---|
| 2,119,837 | 6/1938 | Wehrle | 426/320 |
| 4,200,657 | 4/1980 | Cook | 422/29 |
| 4,215,508 | 8/1980 | Allen et al. | 43/125 |
| 4,223,044 | 9/1980 | Se | 422/32 |
| 4,651,463 | 3/1987 | Friemel | 422/32 |
| 4,853,241 | 8/1989 | Dörnemann | 422/32 |
| 4,889,708 | 12/1989 | Latif et al. | 422/28 |
| 4,966,755 | 10/1990 | Smith | 422/292 |
| 5,098,664 | 3/1992 | Schellhaas et al. | 422/305 |

FOREIGN PATENT DOCUMENTS

| | | |
|---|---|---|
| 0 298 599 | 1/1989 | European Pat. Off. . |
| 2 487 638 | 2/1982 | France . |
| 91/19671 | 12/1991 | WIPO . |

OTHER PUBLICATIONS

English translation of FR 2,487,638.

*Primary Examiner*—Nina Bhat
*Attorney, Agent, or Firm*—Millen, White, Zelano, & Branigan, P.C.

[57] ABSTRACT

The invention relates to a chamber for use in a fumigation method to produce a fumigant gas mixture and supply it to a circulatory loop gas flow system gas. The chamber is adapted to receive fumigant gas generation device and includes:

an inlet port controlled by an inlet valve, an outlet port controlled by an outlet valve, a flushing gas inlet controlled by a flushing gas inlet valve for connection to a source of inert gas, a vent valve, and access means openable for access to its interior from a position outside of the fumigation space.

The chamber forms part of the loop gas flow system when connected to ends of a gas duct. The invention further relates to a method of fumigating a bulk commodity in an enclosed fumigation space wherein the fumigant gas mixture is generated in the chamber as well as to use of the chamber in such a fumigation method.

43 Claims, 5 Drawing Sheets

FUMIGATION CHAMBER

BACKGROUND OF THE INVENTION AND PRIOR ART

The present invention relates to a chamber for use in a fumigation method to produce a fumigant gas mixture and supply it to a circulatory loop gas flow system including an enclosed fumigation space wherein fumigation of a commodity is to take place and a gas duct including gas propulsion device connected to opposite regions of the fumigation space, the chamber being adapted to receive fumigant gas generation means for releasing fumigant gas. The invention also relates to a method of fumigating a bulk commodity in an enclosed fumigation space and to the use of the chamber in such a method.

Phosphine gas is a highly toxic and flammable gas used in large quantities more often than not as the fumigant gas of choice in pest control, and in particular for the fumigation of agricultural bulk commodities, such as grain and grain products.

Traditionally compositions containing hydrolyzable metal phosphides, in particular aluminum, magnesium and calcium phosphides have been used for this purpose, applied either in sachets or other dispenser devices or as moulded bodies (pellets or tablets).

In either case, the traditional compositions have always been compounded with various additives to a) reduce the reactivity of the metal phosphide when exposed to water in vapor or liquid form and b) to depress their tendency to autoignite. (Rauscher et al U.S. Pat. No. 3,132,067, Friemel et al U.S. Pat. No. , 3,372,088, Friemel et al U.S. Pat. Nos. 4,421,742 and 4,725,418, Kapp U.S. Pat. No. 4,347,241). In spite of these expedients, these prior art products remained dangerous substances, involving fire and explosion hazards which had never been fully overcome if the products are handled inexpertly and stringent safety precautions are neglected. The degree of safety also depends on the experience of the manufacturer and quality control.

Specific methods relate to the fumigation of bulk commodities in bulk storage containers, such as silo bins and ship holds. Formerly the usual method involved introducing metal phosphide compositions in the form of pressed bodies, for example pellets or tablets, simultaneously with the bulk commodity, more or less evenly distributed therein. A disadvantage of this method resides in the unavoidable contamination of the bulk commodity with the residues of the spent pest control compositions.

A more recent, commercially very successful, method is to distribute fumigant gas generation means such as the aforesaid pellets or tablets on the surface of the product to be treated and thereafter to ensure a circulation of air within the enclosed environment in order to effect uniform distribution of the gas and avoid the buildup of dangerously high local concentrations of the gas which could lead to autoignition and comatose states of the pests from which the latter may subsequently recover. (U.S. Pat. Nos. 4,200,657 and 4,651,463 corresponding to ZA Patents 79/6807 and 83/5402 and corresponding patents in other countries) In order to avoid the above-mentioned contaminations, the gas generation means may be sachets containing hydrolyzable metal phosphides and/or what is known in the art as "bag blankets" containing same which are suspended or rolled over the surface of the product to be treated.

These latter systems, employed up until now, had been a great improvement but have still suffered from a number of disadvantages.

Firstly, a distribution of the gas generation means on the surface of the product to be disinfested results in the gas generation means needing to be collected after the fumigation process is completed. This is often difficult and cumbersome. The spent devices must then be disposed of, a matter which nowadays may cause problems.

Also, an equal distribution of the gas generation means on the surface of the commodity to be fumigated needs to be achieved. The phosphine gas can, over a certain concentration (17 800 ppm), become self-igniting. An accumulation of gas generation means in a particular area may lead to dangerous concentrations of this phosphine gas forming within the closed environment, unless the prior art precautions, such as adequate circulation, are strictly observed, as may happen if the circulation is too slow or is inadvertently stopped, for example, due to a power failure. Excessive localized phosphine concentrations may also temporarily put the pests into a comatose state from which they may recover, causing incomplete pest control.

Coupled to this, air flow through a conical shape (as grain etc tends to assume in a silo) is irregular, there being a lower air flow through the apex of the cone. This may result in a concentration of phosphine gasses in this area and general lack of uniformity of the gas distribution and circulation, a matter aggravated very often in applying gas circulation to ship hold fumigation.

Further to this, the conditions within the confined environment cannot easily be controlled. The silos etc are normally exposed to the elements, sun, rain etc., which may affect the rate of gas generation. In addition, agricultural products are known to respire and the relative humidity content may change over a period of time. Should the gas generation means come into contact with liquid water, the phosphine gas generation reaction may become too violent.

Finally, once the fumigation process is initiated, it is difficult and usually impossible to control the rate of gas generation or to stop the fumigation process.

The aforesaid U.S. Pat. No. 4,200,657 does disclose an embodiment wherein the phosphide pellets or tablets are laid out in a gas distribution chamber within the circulation pipe system near the bottom of a silo bin. Although this embodiment avoids direct contact of the composition with the bulk commodity and thus avoids the contamination, it does not address the remaining problems. In particular it can neither prevent dangerous localized accumulations of phosphide composition and localized gas and heat build-up, nor can it be used to stop the phosphine releasing reaction in the event of an emergency.

Accordingly, it has been recognized that it would be highly advantageous if it were possible to transfer the generation of phosphine gas to a locality outside the fumigation space whereafter the gas could then be fed into the commodity or storage facility in a controlled manner. However, because of the conceived and real risks inherent in phosphine gas and phosphine-releasing compositions, very, little real progress has been made in this regard.

Thus the use of bottled $PH_3$, produced by one or other undisclosed industrial process, has been proposed in U.S. Pat. No. 4,889,708. Again, in order to prevent autoignition once the gas is released into air and the mixture of air and gas is used as a fumigant, it was considered necessary to bottle the $PH_3$ highly diluted with an inert carrier gas such as $CO_2$ or $N_2$. According to U.S. Pat. No. 4,889,708 the $PH_3$ concentration in the bottled gas is to be 1.8 to 3% by weight. The storage and transport of this highly diluted phosphine gas involves considerable logistics problems, besides being very expensive. It also involves the grave risk that in the event of an accident on site, in transport or in storage or in the event of leaking bottles, e.g., due to defective or not properly closed valves, a gas cloud, albeit not readily flammable, is formed which is highly toxic and which, because it is heavier than air, can accumulate in low-lying areas or in cellars or the like.

U.S. Pat. No. 5,098,664 (RSA Patent No 88/8881) and corresponding foreign patents provide an apparatus and process for generating a mixture of phosphine gas and air for fumigating an enclosed environment, the gas generation process being effected separate from the enclosed environment, the gas/air mixture thereafter being fed into and optionally circulated through the enclosed environment and product to lie disinfested. The rate of gas generation is controlled by supplying an air supply to the gas generation means, the air supply having a controlled humidity level and temperature.

In the event of an operational failure, for example a power failure, it is possible to stop the further generation of phosphine gas by flushing the generator space with an inert flushing medium. As disclosed in this patent the volume of air in which the phosphine generation takes place constitutes hut a small fraction of the total volume of the fumigating space into which the fumigation takes place. Where the latter volume is circulated, the generator air circuit constitutes a minor side stream to the main circulatory system. The disclosed generator is not designed to handle very large circulation volumes, and it would have been unduly costly to control the moisture content of the entire volume of air of the fumigation space in the manner there disclosed. As it is, the control means required for this prior art is intricate and expensive.

A number of more recent similar proposals are disclosed in PCT application WO 91/19671. Some embodiments again involve reaction of metal phosphide compositions with water vapor, and these embodiments are subject to the abovementioned problems. In most embodiments the phosphine is released into a small stream of air, and the risk of ignitable mixtures of phosphine and air being formed cannot be excluded.

OBJECTS OF THE INVENTION

Accordingly there exists a need for an apparatus for the external generation of a fumigant gas and a fumigation process as described in the aforegoing which does not suffer from the aforesaid disadvantages or wherein these disadvantages are substantially mitigated.

In particular there exists a need for an apparatus permitting the safe production of phosphine-containing gases in an environmentally friendly manner, with a minimum of disposal problems of potentially harmful metal phosphide residues. Such apparatus should also be easily controllable in the case of operational failures, e.g., electrical power failures.

A further need exists for the apparatus to be relatively simple, cheap to operate and reliable. In particular a need exists for the apparatus to prevent or minimize the occurrence of undue and/or unequal fumigant gas concentrations in a fumigation system.

A further need exists for the apparatus for fumigating an enclosed environment to ensure that little or no residue of the gas generation means (metal phosphide residue) is carried to or remains in or on the product fumigated.

A further need exists for the process of gas generation to occur under substantially controlled conditions, preferably in the absence of intricate humidity control means.

A further need exists for the fumigation process to be cheap and reliable yet easily controlled or stopped at any given point, preferably automatically in the event of a power failure or other operational failure.

GENERAL DESCRIPTION OF THE INVENTION

According to a first aspect of the present invention there is provided a chamber for use in a fumigation method to produce a fumigant gas mixture and supply it to a circulatory loop gas flow system including an enclosed fumigation space wherein fumigation of a commodity is to take place and a gas duct including gas propulsion device connected to opposite regions of the fumigation space, the chamber being adapted to receive fumigant gas generation means for releasing a fumigant gas, wherein the chamber includes:

an inlet port controlled by an inlet valve connectable to an end of the gas duct of the loop gas flow system, leading from the fumigation space, an outlet port controlled by an outlet valve connectable in downstream position to mother end of the gas duct of the loop gas flow system, leading into the fumigation space, a flushing gas inlet controlled by a flushing gas inlet valve for connection to a source of inert gas, a vent valve, the chamber having access means openable for access to its interior from a position outside of the fumigation space, the chamber forming part of the loop gas flow system when connected to the ends of the gas duct when the inlet and outlet valves are open.

The invention extends to the chamber as hereinbefore described which is connected into the circulatory loop gas flow system by having its inlet port connected to said one end of the gas duct leading from the fumigation space and its outlet port connected to said another end of the gas duct leading into the fumigation space.

Preferably the chamber provides a negative pressure at the outlet valve due to the gas propulsion device being located downstream of the chamber in the circulatory loop gas flow system. This will result in gas being "sucked" through the chamber thereby minimizing dead spaces within the chamber where little or no gas flow occurs.

Preferably there is associated with or included in the chamber a means responsive to a power failure or a fault in gas circulation to cause the inlet and cutlet valves to close and the flushing gas inlet valve to open on occurrence of such a failure or fault.

The inlet and outlet valves may be biased toward a dosed position but operable to be held in an open position when power is supplied to the valves or their means of control.

In one embodiment of the invention the inlet and outlet valves each comprise a valve seat and a valve stem. Included on the valve stem of each valve is a first lip and a second lip. The control means of the inlet and outlet valves include a solenoid and associated therewith a clip which is engageable with the first lip on the stem of the valves to retain the valves in an open position against their direction of bias.

When the valve is in an open position the second lip of the valve stem retains a coiled spring in a compressed position, the spring serving to urge the valve toward a closed position. When the first lip of the valve stem is engaged with the clip of the solenoid the valve is retained in its open position. Upon withdrawal of the clip, however, for example, when power is denied to the solenoid, the valve is allowed to move to its closed position under the action of an axial force applied to the second lip on the valve stem by the coiled spring.

In an alternative embodiment to the invention, the valves are retained in their open position by means of pneumatic rams which, when connected to an air line, force the valves into their open position against their direction of bias. The connection of the rams to the air lines may be controlled by a solenoid which interrupts the air line to the rams upon an interruption of power to the solenoid.

Portions of the valve seats which seat against ducts (which lead into the chamber from the inlet and outlet ports) when the valves are in their closed positions are preferably covered in a pliable material to ensure flush seating of the valve seats against the ducts.

As described above, the valves of the chamber are connected in series to a gas propulsion device which is circulating gas through the lop gas flow system. Should the gas propulsion device fail through lack of power or any other reason, the inlet and outlet valves close thereby isolating the chamber from the circulatory loop gas flow system. The gas propulsion device may be a fan or a blower.

The inlet port is preferably located in an upper portion of the chamber and the outlet port located in a lower portion of the chamber.

Preferably the flushing gas inlet valve or control means thereof is linked to the inlet and outlet valves or control means thereof so that when the inlet and outlet valves close, the flushing gas inlet valve opens allowing inert flushing gas to enter the chamber.

The control means of the flushing gas inlet valve may also be linked to a power source and the valve is preferably then held closed when power is supplied to the control means. When current is denied to the control means, however, the valve will open allowing the inert flushing gas to enter the chamber.

The inert flushing gas is preferably contained in a pressurized cylinder connected to the flushing gas inlet valve. The valve is preferably not closable unless under pressure from the cylinder attached to it. Preferably the inert flushing gas is $CO_2$ but it will be appreciated that any inert gas with a zero or minimal humidity content, for example, $N_2$, may be used.

Upon opening of the flushing gas inlet valve the cylinder is preferably completely vented. This may happen over a predetermined period of time to allow for complete flushing until the fumigant gas generation has ceased. Preferably the gas propulsion device will not operate unless a filled gas cylinder is attached to the inlet valve which is closed.

The volume of the gas cylinder attached to the flushing gas inlet valve is preferably such that it contains sufficient gas to flush the entire chamber.

The flushing gas inlet valve connected to the gas cylinder is preferably located at a lower portion of the chamber in order to fill the chamber from the bottom up with $CO_2$ should the flushing gas inlet valve open. The release of $CO_2$ is preferably regulated in order to prevent freezing of the gas or any part of the chamber or valves as the gas enters the chamber.

In a preferred embodiment the inlet valve connected to the $CO_2$ cylinder leads into a hollow, substantially toroidally shaped member located in a lower region of the chamber. The member has vents provided therein to permit the $CO_2$ to enter the chamber at a regulated rate.

The vent valve of the chamber is preferably located in an upper portion of the chamber, the valve venting to a scrubber system or to the atmosphere. Alternatively, or in conjunction with the above, the valve may vent into the circulatory loop gas flow system, preferably downstream from the chamber. In such an embodiment the vent valve may still include pressure control to also vent to atmosphere if the pressure in the system rises too much. The vent valve may be mechanically operable to be biased toward a closed position, the valve being responsive to a pressure within the chamber to open when the pressure inside the chamber exceeds a predetermined limit. The predetermined limit may be from 1 to 50 Bar, preferably from 1.5 to 10 Bar, for example 3 Bar.

In a preferred embodiment of this aspect of the invention, upon the closing of the inlet and outlet valves connected to the circulatory loop gas flow system, the flushing gas inlet valve opens approximately simultaneously or shortly thereafter. As the flushing gas is admitted to the chamber upon the opening of the flushing gas inlet valve, the pressure within the chamber rises, causing the vent valve to open. Any residual fumigant gas in the chamber may be displaced from the chamber through the vent valve thereby avoiding a build up of pressure within the chamber. The atmosphere within the chamber is therefore exchanged for that of an inert atmosphere in which the generation of fumigant gas is inhibited.

The chamber preferably includes as said access means a roof portion of the chamber which is removable and is retained on the remainder of the chamber by means of releasable fasteners.

The releasable fasteners may be in the form of releasable clips. Alternatively, the roof portion of the chamber and the remainder of the chamber may each be provided with flanges at their area of contact, the releasable fasteners being in the form of butterfly screws which are swivelably attached to either the roof portion or the remainder of the chamber to be swivelable through complementary shaped grooves in the two flanges when the roof portion and remainder of the chamber are aligned. In such a manner the roof portion and remainder of the chamber may be retained together when the butterfly screws are swivelled through the grooves in the flanges and tightened.

Preferably there is included between the roof portion and the remainder of the chamber a pliable material for substantially sealing the area of contact between the two portions. The pliant material may be in the form of an elastomeric O-ring or gasket.

Alternatively the chamber may include a closure in the form of a door allowing access to the chamber which, when closed, is in a sealing relationship with the chamber.

The chamber as hereinbefore described preferably includes internals designed to carry fumigant gas generation means in a manner that allows the gas generation means to be uniformly exposed to gas flow through the chamber. In particular, the internals may avoid accumulations of the fumigant gas generation means within the chamber. In so doing the internals may avoid uneven accumulations of the fumigant gas so generated and localized, heat accumulation within the chamber.

The internals of the chamber may be borne on an internal bearing structure accommodated within the chamber. The bearing structure may take the form of a cross shaped framework within the chamber. The cross shaped framework may include means for engaging the internals borne on the framework.

In one embodiment of the invention the internals are in the form of trays. Preferably the trays are complementarily shaped to an internal shape of the chamber and coaxial with the chamber with a peripheral gap between the trays and the inner periphery of the chamber. The trays preferably also include a tubular portion extending through the tray in a direction approximately normal to the plane of the tray, the tubular portion being located approximately in the middle of and coaxially with the tray. The trays may include a lip or flange located on a periphery of the trays, the tubular portion extending above the height of the lip of the trays.

Preferably the height of the lip of the trays is between 60 and 90%, more preferably between 70 and 85%, most preferably 80% of the height of the tubular portion of the trays.

The invention extends to a chamber as hereinbefore described including the trays stacked upon each other in such a manner that the tubular portions of the trays are co-axially aligned and define a passage through which gas may flow from the inlet port of the chamber. Preferably the lowermost tray stocked within the chamber permits gas flow across the tray but not through it.

Gaps preferably exist between each of the tubular portions of the trays when the trays are stacked within the chamber, the gaps permitting gas flow out from the passage defined by the tubular portions of the aligned trays and over each of the trays. The combined area of the gaps between the tubular portions of the aligned trays, the combined area being the circumference of the tubular portions multiplied by the distance between the tubular portions of each tray when stacked within the chamber, is preferably approximately equal to the cross sectional area normal to the direction of gas flow of the valve controlled inlet duct.

Accordingly, approximately equal gas flow is experienced over each of the trays as the gas flows from the inlet port down the passage defined by the tubular portions of the trays, over the trays and down the sides of the chamber to the outlet port.

The trays preferably include matching formations for engaging the trays above and below each tray. Such matching formations may be in the form of male and female members, for example, the male members extending downwardly from the trays to engage with female members extending upwardly from the trays.

The trays may be sequentially numbered to aid in their stacking within the chamber.

The invention extends to a chamber as hereinbefore described, charged with hydrolyzable metal phosphide-containing fumigant gas generation means which is in the form of tablets, pellets, sachets or bag blankets.

Preferably the fumigant gas generation means is in the form of phosphine gas generation tablets or pellets, which may contain hydrolyzable metal phosphide, for example, aluminum phosphide, which when in contact with water generates phosphine gas ($PH_3$). The tablets or pellets, which are preferably spherical in shape although it will be appreciated that they could be any shape designed to inhibit congregation of the tablets atop one another, may be scattered substantially evenly about on the trays within the chamber.

Alternatively, or in conjunction with the tablets, sachets may be uniformly spread about the trays in a manner similar to the distribution of tablets as hereinbefore described.

Alternatively, one or more bag blankets may be suspended in the chamber, for example, in the shape of a coil. In the latter case the windings of the bag blankets are preferably separated by spacer units which prevent the bags, touching at the point of their suspension. (Such sachets and bag blankets are contemplated in ZA Patent Nos. 80/1382, 79/2263 and corresponding patents elsewhere, e.g. GB 2046577 and 2065474).

It will be appreciated that other chemical alternatives for fumigant gas generation means may be used in the chamber. Such alternatives include preparations releasing cyanide gas or the like It is, however, preferred that metal phosphide preparations are used because of the phosphine gas generated, any residue of which is oxidized to a harmless phosphate when the fumigated commodity is processed. Any phosphine released to the atmosphere is likewise converted to harmless phosphoric acid.

In an alternative embodiment of the invention, the internals of the chamber are in the form of a holder which permits gas flow therethrough. The holder preferably includes ribs and slats capable of accommodating fumigant gas generation plates (see DE Patent 2002655).

The plates may be of a standardized commercially available type, wherein the active ingredient is magnesium phosphide embedded in a fibrous resin-bonded matrix and covered with a layer of strong paper. The plates may be stacked vertically on the holder to permit a gas flow from the inlet duct to the outlet duct of the chamber down and across the faces of the plates. The holder may be so dimensioned so as to fit the maximum number of plates within the chamber.

The invention further extends to a chamber as hereinbefore described in combination with ad- or absorber means for fumigant gas, adapted to be installed inside the chamber.

Where the fumigant gas is phosphine, the ad- or absorber means may be in the form of charcoal previously activated in silver nitrate ($AgNO_3$) solution or various other, for example copper salt ad- or absorber means. Preferably, however, such means are regenerative, for example, such means are zeolites (see ZA Patent No 89/3457 and corresponding patents in other countries). The ad- or absorber means may be incorporated within or be in the shape of premoulded bodies.

The invention extends to a chamber including a device for containing ad- or absorber means of fumigant gas, the device dimensioned to be accommodated within the chamber and including an inlet manifold and at least one side defining wall allowing for gas flow across it. The side defining walls may permit gas flow across them by having holes effected through the material from which the device is constructed.

The device may have a removable lid for ease of loading the device with fumigant gas ad- or absorber means.

It is also contemplated that the chamber may include a scrubber device contained therein or thereon.

The chamber as hereinbefore described overcomes the disadvantages of the prior art in the following manner:

There is no contamination of the commodity fumigated with residue of the decomposed fumigant gas generation means (metal phosphide), such residue remaining within the chamber for easy removal. Furthermore, the chamber and internals are designed to ensure no residue becomes entrained in the gas flow.

The rate of fumigant gas generation within the chamber occurs at a rate in equilibrium with conditions within the enclosed fumigation space. In addition no unequal or inordinate rates of fumigant gas generation are experienced in the circulatory loop gas flow system due to fumigant gas generation means being exposed to random elements, for example rain and the like.

The chamber is include within the circulatory loop gas flow system and does not constitute a minor side stream. In the event of operational failure the chamber is isolated from the circulatory loop gas flow system ensuring that no dangerously high levels of fumigant gas occur within the system.

In the event of operational failure no gas mixtures containing excessively high levels of fumigant gas occur within the chamber or elsewhere for the following reasons:

Due to its inclusion within the mainstream of the gas circulation loop, no excessive concentrations of fumigant gas accumulate until the failure occurs.

The chamber is filled with inert gas from the bottom up expelling phosphine gas in the chamber out through the vent valve.

The atmosphere within the chamber is inert and autoignition (spontaneous oxidation of the phosphine gas) is not possible in the absence of $O_2$.

Even if fumigant gas continues to generate within the chamber any excessive increases in pressure within the chamber will cause the vent valve to open and fumigant gas to be expelled.

According to a second aspect to the present invention there is provided a method of fumigating a bulk commodity in an enclosed fumigation space forming a circulatory loop gas flow system together with a gas duct and a gas propulsion device, the method including the steps of generating a fumigant gas mixture, thereby providing a pesticidal concentration of fumigant gas mixture in the enclosed fumigation space and circulating the fumigant gas mixture through the commodity, wherein the fumigant gas mixture is generated in a chamber including:

an inlet port controlled by an inlet valve connectable to an end of the gas duct of the loop gas flow system, leading from the fumigation space, an outlet port controlled by an outlet valve connected in downstream position to another end of the gas duct of the loop gas flow system, leading into the fumigation space, a flushing gas inlet valve for connection to a source of inert flushing gas and a vent valve, the chamber having access means openable for access to its interior from a position outside of the fumigation space, the method further including the steps of charging the chamber through the access means with the fumigant gas generation means, connecting the chamber by way of the inlet port and the outlet port to form part of the circulatory loop gas flow system, opening and keeping open the inlet and outlet valves and operating the gas propulsion device to maintain a circulatory gas flow through the circulatory loop gas flow system, while generating the fumigant gas mixture.

Preferably the gas propulsion device is located downstream from the chamber.

The method may be controlled by at least one fumigant gas concentration measuring device and/or gas flow measuring device included in the circulatory loop gas flow system and linked to the gas propulsion device and valves of the chamber in a feedback manner.

Fumigant gas concentrations should not exceed a predetermined limit, for example 2000 ppm, in any part of the loop gas flow system including the chamber. Upon fumigant gas levels exceeding this amount in any area of the system, gas flow rates within the loop gas flow system may be increased to inhibit build up of concentrations in areas of the loop system. Alternatively the system could be shut down and the chamber vented as hereinbefore described.

In the method as hereinbefore described the circulation of the fumigant gas mixture is preferably carried out at a rate to result in a complete circulation of fumigant gas mixture through the enclosed fumigation space in not less than 1.5 hours. Preferably the circulation is at least sufficient to result in a complete circulation of air through the fumigation space every 6 days (144 hours), more preferably not more than 3.5 days. Preferably, however, a complete circulation is performed within 1.5 to 20 hours, more preferably 2.5 to 10 hours, for example within 4 hours.

It will be appreciated that the gas flow need not necessarily be continuous and that intermittent flow rates of higher volumes per minute but which nonetheless, over a period of time, result in a complete circulation times as hereinbefore described or in average flows as set out hereunder, are contemplated.

The flow rate of fumigant gas mixture is preferably less than $0.005$ $m^3/min \times m^3$ of the total volume of the enclosed fumigation space. The flow rate is preferably selected from between $0.0016$ $m^3/min$ $m^3$ and $0.0002$ $m^3/min \times m^3$ more particularly between for $0.0011$ $m^3/min \times m^3$ and $0.0009$ $m^3/min \times m^3$ example $0.0010$ $m^3/min \times m^3$.

The method as hereinbefore described preferably includes the sequence of steps of loading the chamber as follows:

opening the inlet and outlet valves and retaining them in an open position;

turning on the gas propulsion device;

loading the chamber with gas generation means;

closing the chamber and commencing circulation through the circulatory loop, including the chamber and the fumigation space, with the vent valve closed.

As hereinbefore described, the gas propulsion device will preferably not run unless the flushing gas inlet valve is closed. A relay acting in conjunction with the flushing gas inlet valve may cause a solenoid to close allowing the gas propulsion device to run only when the flushing gas inlet valve is closed. Preferably the gas propulsion device will also not run unless the inlet and outlet valves of the chamber are open.

The method is preferably carried out with a fumigant gas generation means containing a hydrolyzable metal phosphide, for example aluminium phosphide or magnesium phosphide, which on hydrolysis releases phosphine gas, and wherein humidity contained in the circulatory gas loop is passed through the chamber in contact with the metal phosphide.

Conditions within the enclosed fumigation space preferably act as a rate limiting factor in the generation of fumigant gas in the chamber, the humidity content and temperature of air passed through the chamber from the enclosed fumigation space being in approximate equilibrium with the humidity content and temperature within the enclosed fumigation space.

The method as hereinbefore described has application where the enclosed fumigation space is a bulk container, a bulk storage or transportation vessel or bin, a silo, a ship hold, a railway or road truck. It will be appreciated that application of the invention is not limited to the enclosed fumigation spaces listed above.

The method as hereinbefore described may include the additional step of removing the fumigant gas content in the circulatory gas flow system after completing the fumigation by:

loading the chamber with fumigant gas ad-or absorber means; and running the circulatory gas flow system.

The fumigant gas ad- or absorber means may be charcoal impregnated with silver nitrate ($AgNO_3$) or various other, for example copper salt ad- or absorber means. Preferably, however, such ad- or absorber means are regenerative, for example zeolites. The ad- or absorber means may be incorporated within or be in the shape of premoulded bodies. The ad- or absorber means may be included in a device dimensioned to be accommodated within the chamber as hereinbefore described.

When removing the fumigant gas content in the circulatory gas flow system, the outlet pipe from the chamber may be disconnected from the circulatory loop gas flow system resulting in there being a fresh intake of air into the system, for example, at the gas propulsion device, when gas is circulated through the loop gas flow system.

The bulk commodity fumigated according the method as hereinbefore described may be a heaped particulate agricultural or forestry commodity.

The bulk commodity may be selected from the group consisting of grain, beans, peas, lentils, oil seeds, soya beans, nuts, coffee beans, tea, any of the aforegoing in comminuted, granulated, pelleted or flaked form, milling products of agricultural commodities, particulate or pelleted animal feeds, wood, in particulate form, animal or fish meal, bone meal, bark in a particulate form, cotton, cotton lint, dried fruit, dehydrated vegetables, spices, sago, farinaceous products and confectionery.

According to a third aspect to the present invention there is provided the use of a chamber as hereinbefore described in a method of fumigating a bulk commodity with phosphine gas released from fumigant gas releasing means containing a hydrolyzable metal phosphide.

In the following the invention will further be described by way of example with reference to the accompanying drawings.

DETAILED DESCRIPTION OF EMBODIMENTS OF THE INVENTION

Figure 1:
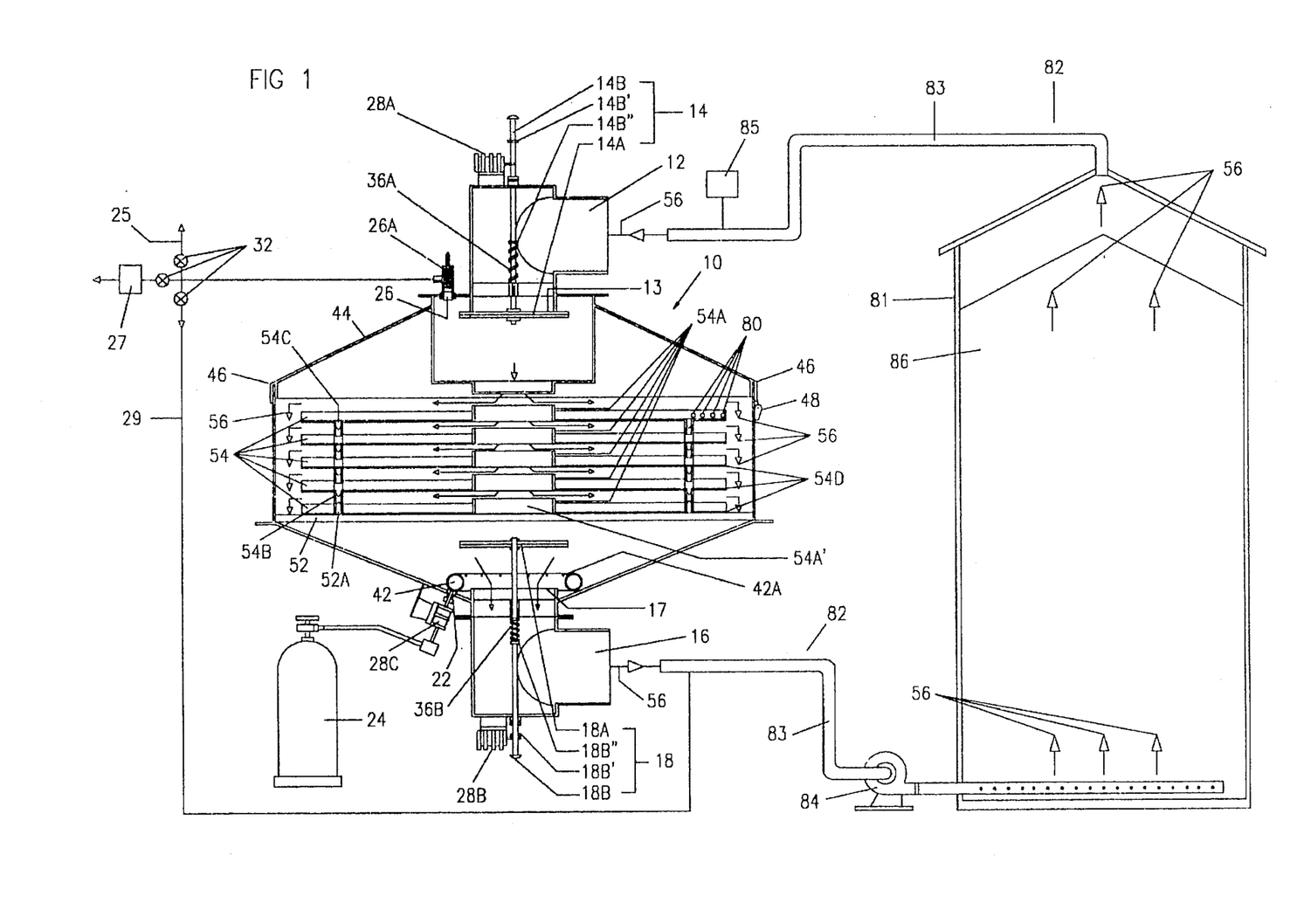
FIG. 1 is a cross sectional elevation through a chamber showing a number of trays included therein.

In FIG. 1 there is shown a gas generator chamber 10 for use in a fumigation method to produce a fumigant gas mixture and supply it to a circulatory loop gas flow system 82 including an enclosed fumigation space 81 (in this case a grain silo) wherein fumigation of a commodity 86 is to take place and a gas duct 83 including a gas propulsion device 84 connected to opposite regions of the fumigation space. Included in the circulatory loop gas flow system is a measuring device 85. The chamber 10 includes an inlet port 12 which leads into the chamber 10 by means of an inlet duct 13 controlled by a valve 14 located in an upper portion of the chamber 10. The inlet valve 14 includes a valve seat 14A and a valve stem 14B. Included on the valve stem 14B are a first lip 14B' for engaging a clip on a control solenoid 28A and a second lip 14B" which may retain a coiled spring 36A in a compressed position. The inlet valve 14 is shown it its closed position.

In a lower portion of the chamber there is an outlet port 16 leading from an outlet duct 17 controlled by an outlet valve 18. The outlet valve includes a valve seat 18A and a valve stem 18B. Included on the valve stem 18B is a first lip 18B' for engaging a clip on a control solenoid 28B and a second lip. 18B" which retains a coiled spring 36B in a compressed position. The outlet valve 18 is shown in its open position.

The chamber 10 also includes a flushing gas inlet valve 22 connected to a lower portion of the chamber 10. Attached to the flushing gas inlet valve 22 is a cylinder 24 of compressed $CO_2$. The valve 22 leads into a toroidally shaped distribution member 42 having vents 42A provided at the top thereof, through which the flushing gas, for example $CO_2$, enters the chamber 10 at a controlled rate.

Located in a top portion of the chamber 10 is a vent valve 26 which is controlled by a spring 26A. When pressure in the chamber 10 exceeds a predetermined level the valve 26 will allow the contents of the chamber to vent. The vent valve 26 may be connected to a scrubber device 27 or it may vent to the atmosphere 25 or it may vent into a circulatory loop gas flow system 29 downstream from the chamber. Where the vent is directed to is controlled by taps 32. Such scrubber device may be similar to or charged with adsorbent or absorbent materials similar to what is described further below in connection with FIG. 7.

The control systems of the inlet 14 and outlet 18 valves include the control solenoids 28A and 28B and the coiled springs 36A and 36B. The valves 14 and 18 are biased to a closed position by the coiled spring means 36A and 36B acting on the second lips 14B" and 18B" on the respective valve stems 14B and 18B. The inlet valve 14 is shown in a closed position. The outlet valve 18 is held in its open position by the clip of the solenoid 28B engaging with the first lip 18B' on the valve stem 18B to hold the valve seat 18A against its direction of bias away from the outlet duct 17. Upon an interruption in power to the solenoid 28B, the clip will withdraw from its engagement with the first lip 18B' en the valve stem 18B allowing the valve seat 18A to move in its direction of bias and close by seating against the outlet duct 17. Seating areas of both valve seats 14A and 18A are covered in a pliable material to ensure a sealing fit with the inlet ducts 13 and 17 when the valves 14 and 18 are in their closed position.

The chamber includes a removable roof 44 including an elastomeric O-ring 46 ensuring a sealing fit with the chamber when the roof is clipped in position by means of clips 48. The roof 44 is frustoconically shaped tapering toward the inlet duct 13.

Included in a lower portion of the chamber 10 is a cross shaped bearing structure 52 including means 52A for engaging trays 54 stacked upon each other within the chamber 10 and borne on the bearing structure 52. The trays support phosphine gas generating pellets 80 and include a central tubular portions 54A which extend through the tray 54. When the trays 54 are stacked within the chamber 10 as shown, the tubular portions 54A of the trays 54 are co-axially aligned and define a passage through which gas may flow 56 from the inlet duct 13 of the chamber 10. Gaps exist between each of the tubular portions 54A of the trays 54, the gaps permitting gas flow 56 out from the passage defined by the tubular portions 54A, over each of the trays 54 and down between the peripheral gap between the trays and an inner peripheral surface of the chamber to the outlet duct 17. The lowermost tray includes a tubular portion 54A which is closed off 54A'. The trays 54 also include an outer lip 54D which prevents gas flowing over the tray 54 from lifting any dust contained on the tray 54. The trays 54 also include male members 54C located on a lower portion of the trays to engage with female members 54B extending up from the trays 54.

Figure 2:
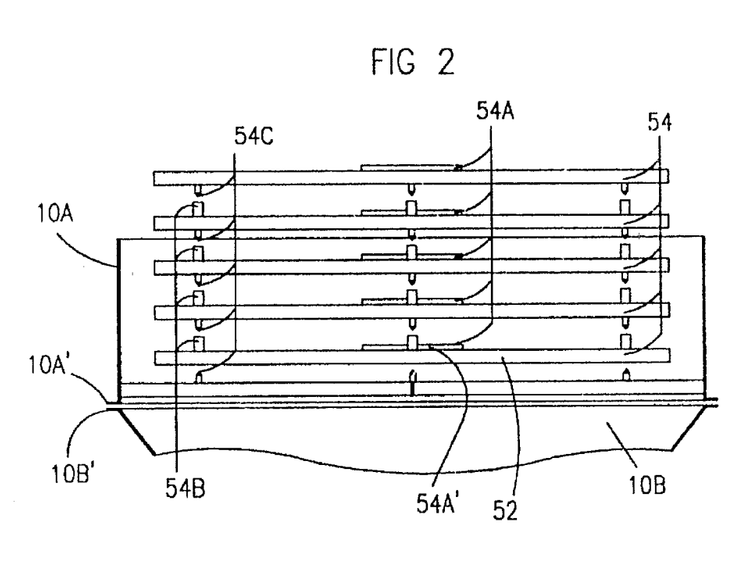
FIG. 2 shows an exploded cross sectional view of a portion of the chamber containing trays.
Figure 3:
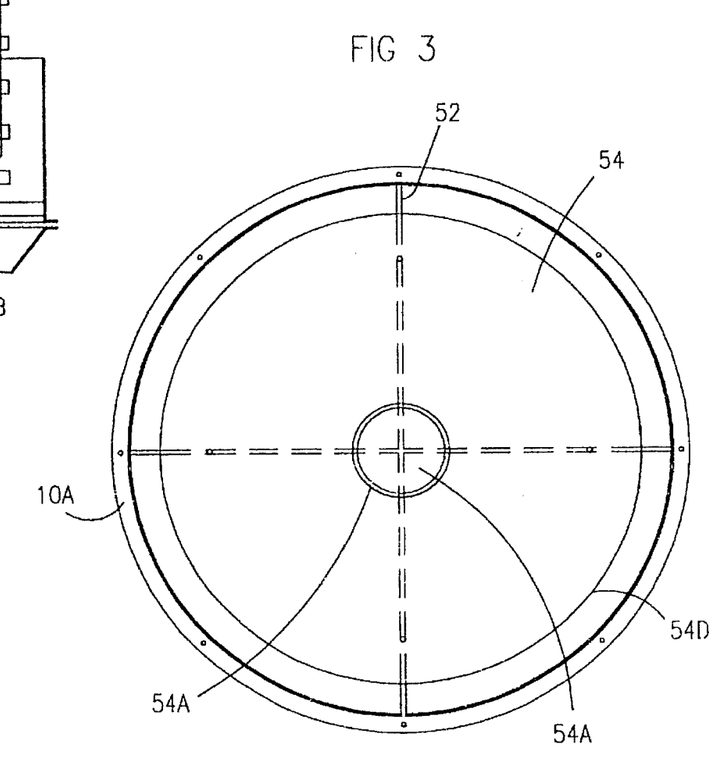
FIG. 3 is a top view of FIG. 2.

In FIGS. 2 and 3 it can be seen that the chamber 10 is composed of two portions 10A and 10B which are joined along their flanges 10A' and 10B'. Portions 10A and 10B is frustoconically shaped tapering toward the outlet duct 17.

Figures 4, 5, 6:
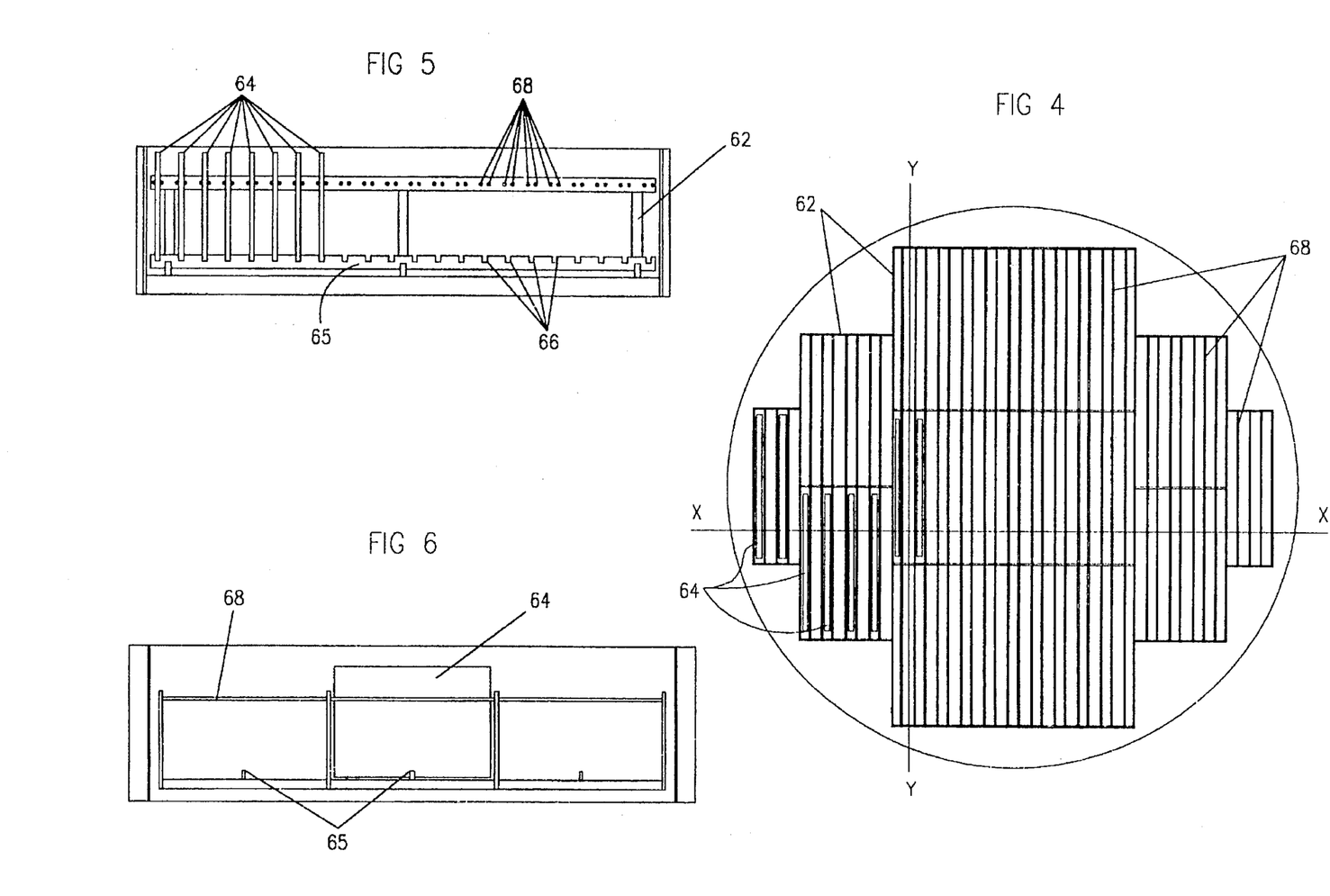
FIG. 4 is an alternate embodiment of FIG. 2 wherein phosphide plates are included in the chamber.
FIG. 5 is a section through X—X in FIG. 4.
FIG. 6 is a section through Y—Y in FIG. 4.

In FIGS. 4 to 6 there can be seen the chamber 10 wherein supports 62 for phosphine gas generation plates 64 which are stacked vertically to allow gas flow over them from the top to the bottom of the chamber (not shown). These plates are of a standardized commercially available type, wherein the active ingredient is magnesium phosphide, embedded in a fibrous, resin-bonded matrix and covered with a layer of strong paper. The supports 62 are slatted to allow gas flow to pass through them and the slats 65 include slots 66 into which the plates 64 fit. The plates 64 are also held in position by ribs 68 on the support which not only serve to support the plates 64 in an upright position but also to keep them spaced equally apart.

Figure 7:
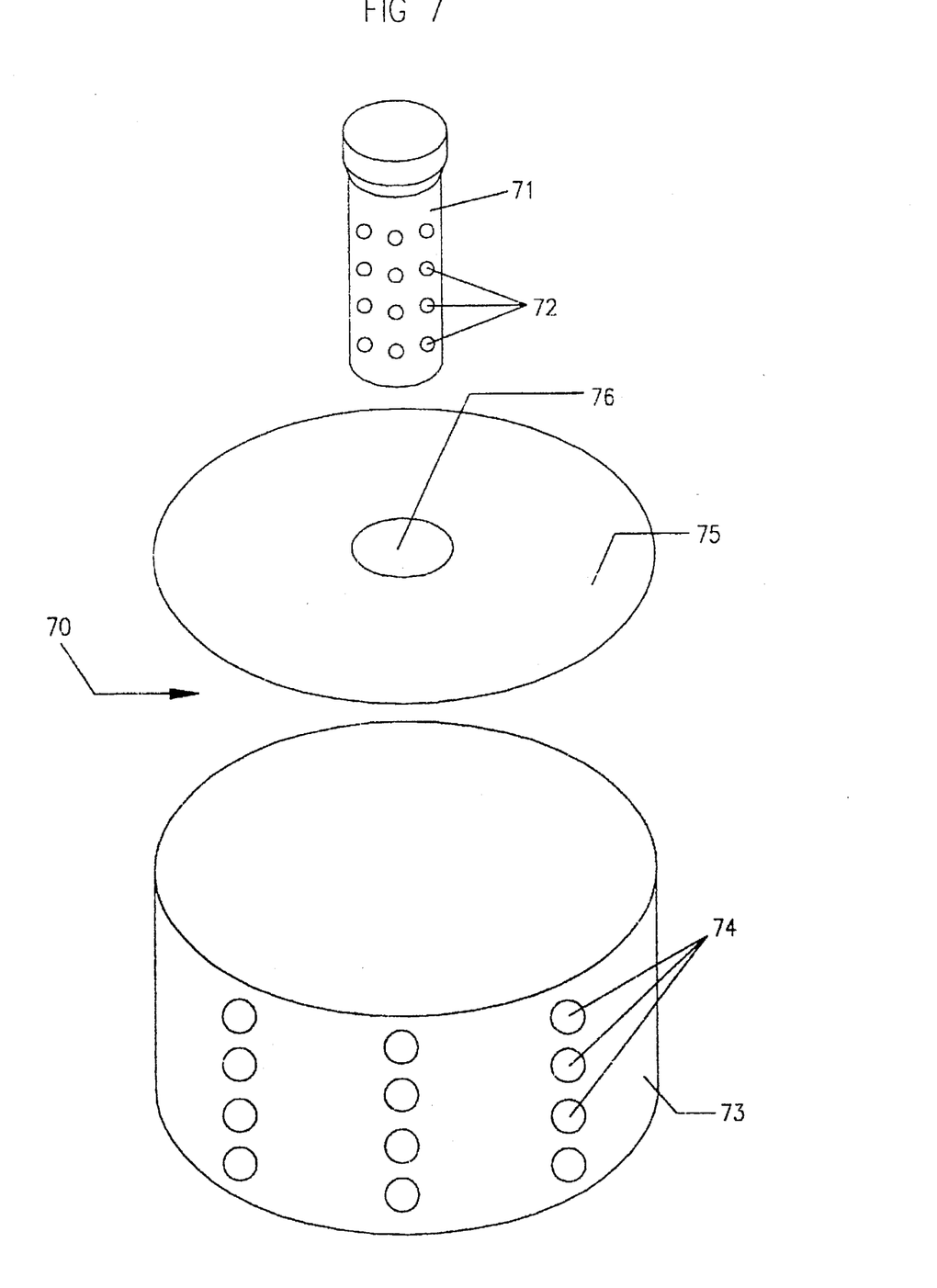
FIG. 7 is an exploded view of a device for containing ad- or absorber means of a fumigant gas.

In FIG. 7 a device for containing ad- or absorber means 70 includes an inlet manifold 71 having a plurality of outlet holes 72 effected through it. The device 70 also has a side defining wall 73 having holes 74 effected through it. The device also has a lid 75 which accommodates the inlet manifold 71 by having a hole 76 effected through the lid 75. The device 70 is so dimensioned so as to be able to fit into the chamber 10 shown in FIG. 1, after the trays have been removed.

Figures 8, 9, 10:
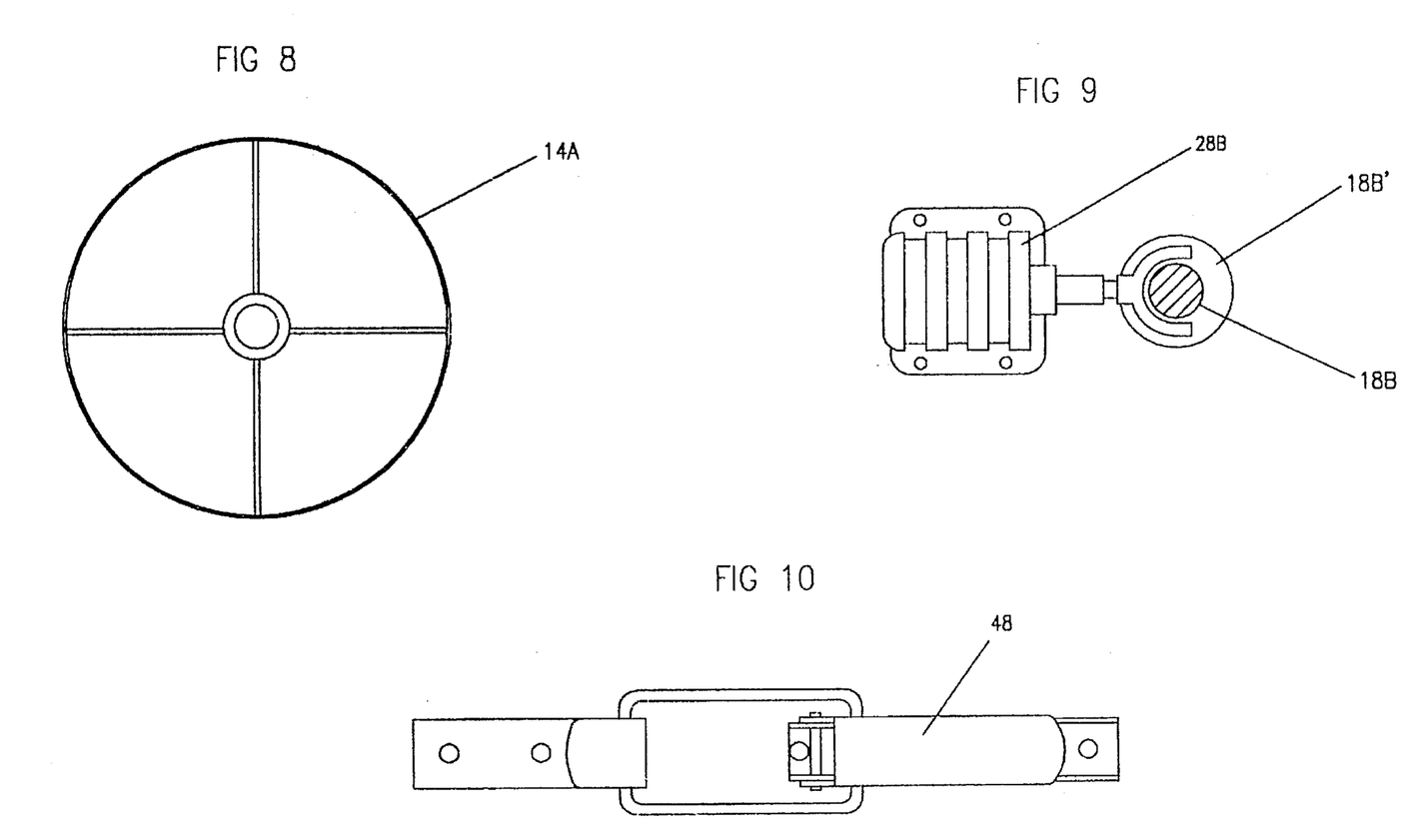
FIG. 8 is a top view of a valve seat.
FIG. 9 is a top view of a control solenoid.
FIG. 10 is a top view of a clip.

In FIG. 8 there is shown the top view of the valve seat 14A in FIG. 1. In FIG. 9 there is shown the top view of the solenoid 28B in FIG. 1, the clip of the solenoid engaged with the first lip 18B' on the valve stem 18B. In FIG. 10 there is shown the top view of the clip 48 in FIG. 1.

What is claimed is:

1. A method of fumigating a bulk commodity in an enclosed fumigation space forming a circulatory loop gas flow system together with a gas duct and a gas propulsion device, said method comprising:

generating a fumigant gas mixture, supplying the fumigant gas mixture to the loop gas flow system so as to provide a pesticidal concentration of fumigant gas mixture in the enclosed fumigation space and circulating the fumigant gas mixture through the commodity, wherein the fumigant gas mixture is generated in a chamber including:

an inlet port controlled by an inlet valve connectable to an end of the gas duct of the loop gas flow system, leading from the fumigation space, an outlet port controlled by an outlet valve connected in downstream position to another end of the gas duct of the loop gas flow system, leading into the fumigation space, a flushing gas inlet valve for connection to a source of inert flushing gas and a vent valve, the chamber having access means openable for access to its interior from a position outside of the fumigation space, said method further comprising:

charging the chamber through the access means with a fumigant gas generation means, connecting the chamber by way of the inlet port and the outlet port to form part of the circulatory loop gas flow system, keeping the flushing gas inlet valve closed, opening and keeping open the inlet and outlet valves and operating the gas propulsion device to maintain a circulatory gas flow through the circulatory loop gas flow system, while generating the fumigant gas mixture.

2. A method as claimed in claim 1, wherein the gas propulsion device is located downstream from the chamber.

3. A method as claimed in claim 1, which is controlled by at least one fumigant gas concentration measuring device and/or gas flow measuring device included in the circulatory loop gas flow system and linked to the gas propulsion device and valves of the chamber in a feedback manner.

4. A method as claimed in claim 1, wherein the circulation of the fumigant gas mixture is carried out at a rate to result in a complete circulation of fumigant gas mixture through the enclosed fumigation space in not less than 1.5 hours.

5. A method as claimed in claim 4, wherein a complete circulation is performed within 1.5 to 20 hours.

6. A method as claimed in claim 1, wherein the flow rate of fumigant gas mixture is less than 0.005 $m^3/min \times m^3$ of the total volume of the enclosed fumigation space.

7. A method as claimed in claim 1, including the steps of loading the chamber as follows:

opening the inlet and outlet valves and retaining them in an open position;

turning on the gas propulsion device;

loading the chamber with gas generation means;

closing the chamber and commencing circulation through the circulatory loop, including the chamber and the fumigation space, with the vent valve closed.

8. A method as claimed in claim 1, wherein said fumigant gas mixture is generated by a hydrolyzable metal phosphide which on hydrolysis releases phosphine gas, and wherein humidity contained in the circulatory gas loop is passed through the chamber in contact with the metal phosphide.

9. A method as claimed in claim 8, wherein the conditions of humidity and temperature within the enclosed fumigation space act as a rate limiting factor in the generation of fumigant gas in the chamber, the humidity content and temperature of air passed through the chamber from the enclosed fumigation space being in approximate equilibrium with the humidity content and temperature within the enclosed fumigation space.

10. A method as claimed in claim 1 wherein the enclosed fumigation space is a bulk container, a bulk storage or transportation vessel or bin, a silo, a ship hold, a railway or road truck.

11. A method as claimed in claim 1, further comprising removing the fumigant gas mixture in the circulatory loop gas flow system after completing the fumigation by:

loading the chamber with fumigant gas ad- or absorber means; and operating the circulatory loop gas flow system to cause the fumigant gas mixture to flow over the fumigant gas ad- or absorber means and be ad- or absorbed onto or into said ad- or absorber means to thereby remove the fumigant gas mixture from the circulatory loop gas flow system.

12. A method as claimed in claim 11, wherein the fumigant gas mixture comprises phosphine gas released from the fumigant gas releasing means, obtained by the hydrolysis of aluminum phosphide or magnesium phosphide, and wherein the fumigant gas ad- or absorber means is charcoal impregnated with silver nitrate ($AgNO_3$) or is a zeolite.

13. A method as claimed in claim 1, wherein the bulk commodity is a heaped particulate agricultural or forestry commodity.

14. A method as claimed in claim 1, wherein the bulk commodity is selected from the group consisting of grain, beans, peas, lentils, oil seeds, soya beans, nuts, coffee beans, tea, any of the aforegoing in comminuted, granulated, pelleted or flaked form, milling products of agricultural commodities, particulate or pelleted animal feeds, wood, in particulate form, animal or fish meal, bone meal, bark in a particulate form, cotton, cotton lint, dried fruit, dehydrated vegetables, spices, sago, farinaceous products and confectionery.

15. A fumigation apparatus comprising:
a chamber for producing a fumigant gas mixture,
said chamber having means for receiving fumigant gas generation means;
an inlet port connected to said chamber, said inlet port being controlled by an inlet valve and being connectable to one end of a gas duct;
an outlet port connected to said chamber, said outlet port being controlled by an outlet valve connectable to another end of said gas duct
a flushing gas inlet connected to said chamber, said flushing gas inlet being controlled by a flushing gas inlet valve and being connectable to a source of inert gas; and
a vent valve connected to said chamber;
said chamber further comprising access means openable for access to the interior of said chamber.

16. An apparatus as claimed in claim 15, wherein said chamber further comprises means responsive to a power failure or a fault in gas circulation to cause said inlet and outlet valves to close said inlet and outlet valves being biased toward a closed position but operable to be held in an open position when power is supplied to said valves or their means of control.

17. An apparatus as claimed in claim 15, wherein said inlet port is located in an upper portion of said chamber and said outlet port is located in a lower portion of said chamber.

18. An apparatus as claimed in claim 15, wherein said chamber optionally further comprises a flushing gas inlet valve control means, and said flushing gas inlet valve or said flushing gas inlet valve control means is linked to said inlet and outlet valves or control means thereof so that when said inlet and outlet valves close, said flushing gas inlet valve opens allowing inert gas to enter the chamber.

19. An apparatus as claimed in claim 15, further comprising a source of inert gas connected to said flushing gas valve, wherein said source of inert gas is a pressurized cylinder,said flushing gas inlet valve not being closable unless under pressure from said cylinder.

20. An apparatus as claimed in claim 19, wherein said source of inert gas is a source of $CO_2$.

21. An apparatus as claimed in claim 15, wherein said vent valve is located in an upper portion of said chamber and said vent valve is in fluid communication with a scrubber system
said vent valve is mechanically operable to be biased toward a closed position and said vent valve is responsive to a pressure within said chamber to open when pressure inside said chamber exceeds a predetermined limit.

22. An apparatus as claimed in claim 15, wherein said access means comprises a roof portion of the chamber which is removable and is retained on the remainder of the chamber by means of releasable fasteners.

23. An apparatus as claimed in claim 15, further comprising fumigant gas generation means and wherein said means for receiving fumigant gas generation means provides uniform exposure of said fumigant gas generation means to gas flow through said chamber.

24. An apparatus as claimed in claim 23, wherein said means for receiving fumigant gas generation means is in the form of at least one tray.

25. An apparatus as claimed in claim 24, wherein said trays are coaxial with said chamber, said trays being positioned to provide a peripheral gap between said trays find the inner periphery of said chamber, each of said trays having a tubular portion extending through the tray in a direction approximately normal to the plane of the tray, said tubular portion being located approximately in the middle of and coaxially with the tray.

26. An apparatus as claimed in claim 25, wherein each of said trays has a lip or flange located on its periphery, and the tubular portion of each individual tray extending above the height of the lip of each individual tray.

27. An apparatus as claimed in claim 26, wherein the height of the lip of the trays is between 60 and 90% of the height of the tubular portion of the trays.

28. An apparatus as claimed in claim 25, containing a plurality of trays stacked upon each other in such a manner that the tubular portions of the trays are co-axially aligned and define a passage through which gas may flow from the inlet port of the chamber, the trays including matching formations for engaging the trays above and below each tray and wherein the lowermost tray stacked within the chamber permits gas flow across the tray but not through it.

29. An apparatus as claimed in claim 28, wherein gaps exist between each of the tubular portions of the trays when the trays are stacked within the chamber, the gaps permitting gas flow out from the passage defined by the tubular portions of the aligned trays and over each of the trays.

30. An apparatus as claimed in claim 29, wherein the combined area of the gaps between the tubular portions of the aligned trays, the combined area being the circumference of the tubular portions multiplied by the distance between the tubular portions of each tray when stacked within the chamber, is approximately equal to the cross sectional area normal to the direction of gas flow of a valve controlled inlet duct.

31. An apparatus as claimed in claim 23, wherein said fumigant gas generation means contains hydrolyzable metal phosphide means in the form of tablets or pellets or sachets or one or more bag blankets suspended in said chamber in the shape of a coil, the windings of which are separated by spacer units.

32. An apparatus as claimed in claim 23, wherein the internals are in the form of a holder which permits gas flow therethrough, the holder including ribs and slats capable of accommodating fumigant gas generation plates.

33. An apparatus as claimed in claim 15, in combination with ad- or absorber means for fumigant gas, dimensioned and constructed to be installed inside the chamber.

34. An apparatus as claimed in claim 15, further comprising a scrubber device in fluid communication with said chamber.

35. An apparatus as claimed in claim 15, wherein said chamber further comprises means responsive to a power failure or a fault in gas circulation to cause said flushing gas inlet valve to open on occurrence of such a failure or fault, said inlet and outlet valves being biased toward a closed position but operable to be held in an open position when power is supplied to said valves or their means of control.

36. An apparatus according to claim 15, further comprising an enclosed fumigation space, a gas duct and a gas propulsion device, wherein said gas duct is connected to opposite regions of said enclosed fumigation space.

37. An apparatus as claimed in claim 36, wherein said inlet port is connected to one end of said gas duct and said outlet port connected to another end of said gas duct, whereby said chamber, said gas duct, said enclosed fumigation space and said gas propulsion device form a circulatory loop gas flow system.

38. An apparatus as claimed in claim 37, wherein said gas propulsion device is positioned to provide negative pressure at said outlet port.

39. A chamber for producing a fumigant gas mixture, said chamber comprising:

an inlet port controlled by an inlet valve, said inlet port being connectable to an end of a gas duct;

an outlet port controlled by an outlet valve, said outlet port being connectable to an end of a gas duct;

a flushing gas inlet, controlled by a flushing gas inlet valve, connected to a source of inert gas;

a vent valve;

fumigant gas mixture generation means; and an internal structure located inside the chamber between the inlet and outlet ports, said internal structure arranged to suspend and distribute the fumigant gas mixture generation means inside the chamber, whereby fluid circulating from said inlet port to said outlet port contacts said fumigant gas mixture generation means and said fumigant gas mixture is distributed into said fluid.

40. A circulatory loop gas flow system for producing and circulating a fumigant gas mixture, said circulatory loop gas flow system comprising:

an enclosed fumigation space, a gas duct connected to opposite regions of said enclosed fumigation space, a gas propulsion device, and a chamber for producing a fumigant gas mixture;

said chamber comprising:

an inlet port controlled by an inlet valve connected to one end of said gas duct, an outlet port controlled by an outlet valve connected to another end of said gas duct, a flushing gas inlet controlled by a flushing gas valve connected to a source of inert gas, a vent valve, access means openable to provide access into the interior of said chamber from a position outside of said enclosed fumigation space, and fumigant gas mixture generation means.

41. A circulatory loop gas flow system according to claim 40, wherein said chamber further comprises an internal structure located inside the chamber between the inlet and outlet ports, said internal structure arranged to suspend and distribute the fumigant gas mixture generation means inside the chamber, whereby fluid circulating from said inlet port to said outlet port contacts said fumigant gas mixture generation means and said fumigant gas mixture is distributed into said fluid.

42. An apparatus according to claim 15, wherein said vent valve is capable of venting gas to the atmosphere.

43. An apparatus according to claim 36, wherein said vent is in fluid communication with said loop gas flow system.

* * * * *